United States Patent [19]
Johnson, Jr. et al.

[11] Patent Number: 5,259,945
[45] Date of Patent: Nov. 9, 1993

[54] PROCESS FOR RECOVERY OF TANK BOTTOM WASTES

[76] Inventors: Lyle A. Johnson, Jr., 510 S. Colorado Ave.; Robert M. Satchwell, 1167 Hidalgo Dr.; Ronald R. Glaser, 153 N. Adams; Lee E. Brecher, 2131 Hancock St., all of Laramie, Wyo. 82070

[21] Appl. No.: 869,280

[22] Filed: Apr. 15, 1992

[51] Int. Cl.$^5$ .............................................. C10G 31/00
[52] U.S. Cl. ................................... 208/13; 208/184; 208/185; 210/768; 210/771
[58] Field of Search ................... 208/13, 184, 185; 210/768, 771; 110/346

[56] References Cited

U.S. PATENT DOCUMENTS 3,692,668 9/1972 McCoy et al. .................. 208/13
4,014,780 3/1977 McCoy .......................... 208/13

Primary Examiner—Theodore Morris
Assistant Examiner—Walter D. Griffin
Attorney, Agent, or Firm—John O. Mingle

[57] ABSTRACT

A process for the recovery of tank bottom wastes employing a flash tank fed with hot, pressurized tank bottom wastes and separating a vapor component and heavier bottoms then fed to a stripping reactor along with hot gas producing an overhead vapor with a solid remainder. Such remainder is alternatively fed to a pyrolyzing reactor at elevated temperatures producing vapors with a solid residue. The vapor streams are used with a regenerative heat exchanger to heat said tank bottom wastes to a temperature appropriate for entering the flash tank. Certain recycled material is employed as fuel.

9 Claims, 1 Drawing Sheet

PROCESS FOR RECOVERY OF TANK BOTTOM WASTES

BACKGROUND OF INVENTION

1. Field of Invention

The present invention relates to processing tank bottom wastes, pit wastes, and other petroleum-based sludges to produce products that meet refinery standards and improve environmental attributes.

2. Background

In recent times tank bottom wastes, sometimes referred to as sludge and often shortened to just tank bottoms, have become an increasing problem since their regulation has often classified them as environmentally hazardous wastes with the corresponding difficult and expensive handling problems. However by appropriate processing this designation can disappear and the resulting constituents become potential product material or can be disposed of in an ordinary manner. Additionally their composition, being a mixture of crude oil, solids, and water, is unacceptable for refineries which would require the removal of significant portions of solids and water.

The amount of this potential tank bottom waste builds to large quantities not only because of the large oil field, pipe line, and refinery capacities in this country, but also because of the storage of these tank bottoms until some disposal method can be employed. Particularly in remote oil fields far from refineries, storage has continued for many years.

Earlier attempts at processing such tank bottoms often employed several common approaches. Filtration using standard commercial filter presses has been accomplished for some tank bottoms that were easily pumpable and oil recovery was significant as well as producing a solid, easily disposable residual. For further enhanced recovery of useful products, solvent extraction was employed particularly if the unit is operated in conjunction with a refinery where such a solvent stream, such as propane, is readily available. The resultant extracted stream then was returned to the refinery for further processing of the extracted oil. The solvent extraction was utilized on the filter cake from premechanical treatment or employed directly into the tank before pumping. Additionally sometimes bioremediation is utilized to treat such tank bottoms both directly and indirectly.

Prior art United States patents covering the above mentioned tank bottoms processing include:

| U.S. Pat. No. | Inventor | Year |
|---|---|---|
| 5,022,992 | Looker | 1991 |
| 4,927,530 | Ueda | 1990 |
| 4,897,205 | Landry | 1990 |

Referring to the above list, Looker discloses a sludge removal apparatus with sloping tank sides and recirculation with an appropriate skimmer designed to remove floating sludge paint particles from water. Ueda discloses a processing unit employing anaerobic bacteria to treat excess sludge from sewage water treatment or other sludge-type material that is acted upon by such bacteria. Landry discloses a process for treating waste material employing steam and recirculated liquid to lower the viscosity of the waste material, such as liquid hydrocarbon and solids, in order to allow removal and subsequent separation by settling; this is particularly used for cleaning tanks.

SUMMARY OF INVENTION

The objectives of the present invention include overcoming the above-mentioned deficiencies in the prior art by providing a process that treats tank bottoms to recover refinery standard products and to make any disposal environmentally acceptable. In addition the process is potentially portable and useful for field operations giving an enhanced economic advantage by reducing transportation requirements. Further because of its low operating costs, it can process small amounts of tank bottoms in remote regions.

The subject invention uniquely combines an initial flash recovery unit with a stripping reactor along with conventional unit operations to perform this economic recovery and treatment of tank bottoms.

DETAILED DESCRIPTION OF INVENTION

Figure 1:
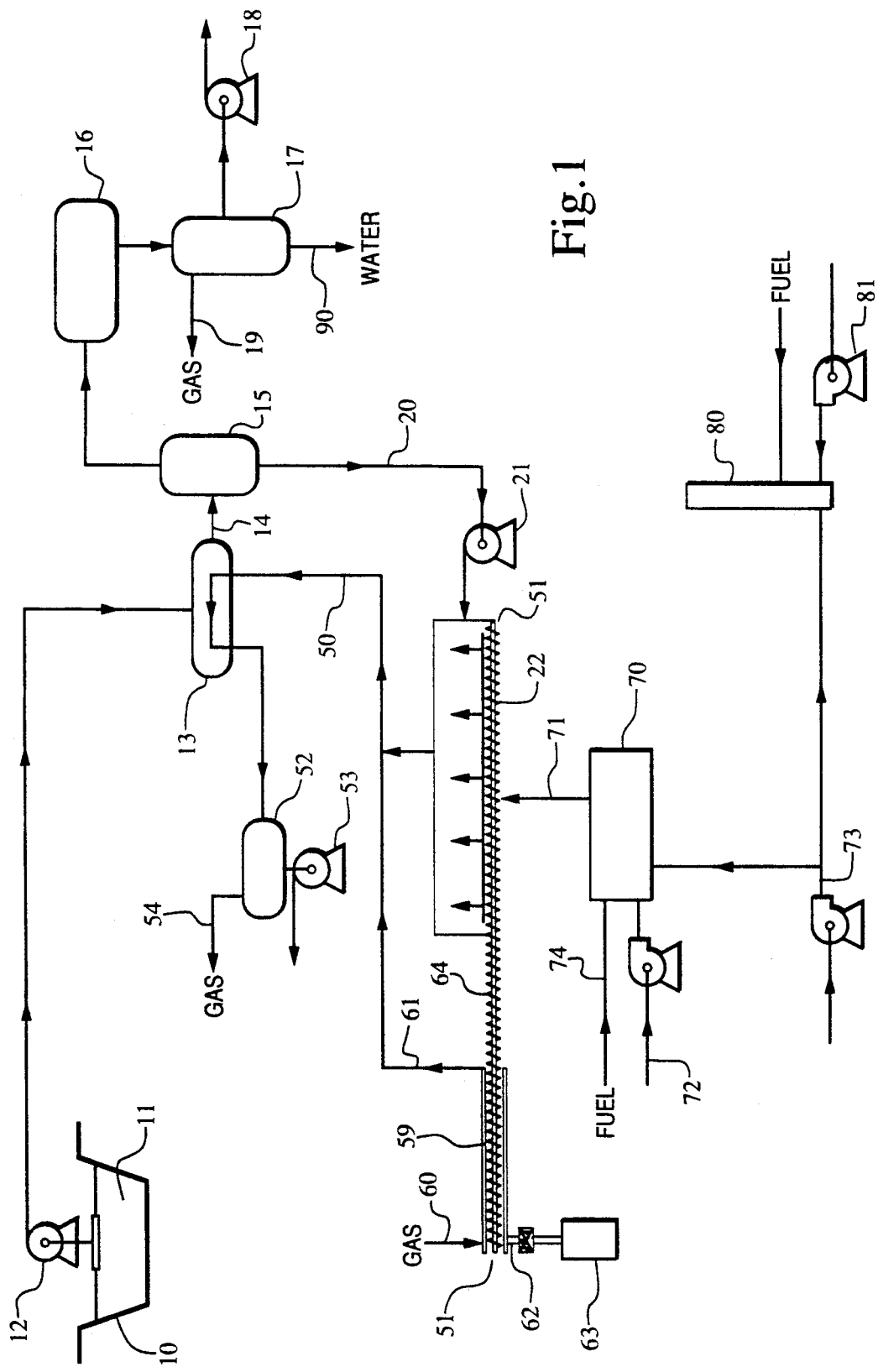
FIG. 1 shows the flow sheet for a typical operation of the process.

One key to successful processing of tank bottoms, particularly if portable operation is required, is to make effective use of regenerative components to lower the heat requirements so that a stripping and pyrolysis reactor system is becomes feasible.

The best mode for processing of these tank bottoms is to employ the main steps of flashing of water and light hydrocarbons, utilizing hot gas stripping to further extract hydrocarbons, and employing final pyrolysis, including some thermal cracking, since the residue is largely solid material.

Hot gas is a generic term that could include a wide variety of sources. It represents vaporous material in a gaseous state at an elevated temperature, but in all instances the temperature is higher than the dew point. It is producible by combustion gas or other burning or alternatively supplied through a separate heat exchanger that heats any desired gaseous composition.

An analysis of tank bottoms yields an example composition of 90% oil, 5% water, and 5% solids. However it is not uncommon to process tank bottoms that are as little as 20% oil or as high as 50% solids; the water concentration is normally not limiting although 75% is a suggested practical limit. The important aspect is that such tank bottoms be pumpable. The normally encountered emulsion of oil, water and solids will not separate by settling and can only be handled by very expensive centrifugal treatment, a method not employed herein.

Two largely economic criteria are ideally met in processing such tank bottoms. First is to recover 85-90 percent of the initial oil and the flashing and stripping operations are designed to perform this. Secondly is to recover 90-95 percent of the initial organic carbon present in the oil so only 5-10% is lost as coke, and the pyrolysis and cracking operations expect to reach this standard. Because coke formation is common with pyrolysis, some tank bottoms may have a composition where this second criteria cannot be met.

In some instances where this recovery of organic carbon is secondary, sufficient oil recovery can often occur by only using the stripping reactor and omitting entirely the pyrolysis reactor. However, the solid discharged from only the stripping reactor is not as environmentally advantageous as that coming from the pyrolysis reactor.

Because of the flash tank preceding the stripping reactor, the latter only has to handle approximately 50-75 percent of the original tank bottoms in a typical case. This reduction in reactor input is an important economical aspect of the subject invention.

A typical flow sheet for the process is shown in FIG. 1. The tank bottoms 11 are present in some type of holder 10 which can be a field pit, sludge pond, or an actual tank either stationary or truck mounted. The pump 12, perhaps with a skimmer, removes the tank bottoms 11 and pumps them through a regenerative heat exchanger 13 where they are heated by a vapor stream 50 coming from the stripping section 22 of the screw reactor or screw apparatus 51, or other standard screw conveyor. The heat exchanger 13 should contain sufficient heat transfer surface to produce a thermal efficiency in the range of 70-90 percent and partial condensation of the heavy oil fraction in said heat exchanger represents a feasible operating condition. The hot tank bottoms 14 which are in the range of approximately 250°-450° F. and are under pressure of about 20-500 psia from regenerative heating and conventional pumping, are fed into a flash tank 15 where flashed light oil and water leave as flashed overhead and are separated by a light oil condenser 16 and a separator 17 for such oil, water, and gas. The light oil is pumped 18 to appropriate storage; however, some is recycled for fuel if necessary. The gas 19 from the separator containing a high proportion of $C_1$-$C_5$ components is collected and normally recycled to provide fuel for the hot gas generator which in the subject case is combustion gas; however, if excess gas occurs, it is burned with a flare 80. The heavier bottoms from the flash tank 15 representing a liquid 20 in a temperature range of about 200°-425° F., are pumped 21 into the screw reactor 51 stripping section 22 where hot gas 71, with a temperature above about 250° F., contacts them and strips off additional vapor containing oil making up part of the vapor stream 50 entering the regenerative heat exchanger 13 which then leaves through a heavy oil condenser 52, and such heavy oil is pumped 53 to storage. The overhead steam 54 from the heavy oil condenser 52 is collected and either burned with a flare 80 or recycled for fuel or sweep gas. The screw reactor 51 further transmits the solid material or remainder through a vapor lock 64 section into a heat exchanger 23 where supplementary heat, such as by electrical resistance heating or high temperature steam, is applied 59, to bring the solid material to approximately 1,000° F., or likely somewhat higher, to allow pyrolysis, and in some instances oxidation, to occur. A sweep gas 60, which may be recycled from other parts of the process, picks up the pyrolysis products and leaves as a vapor stream 61 and is combined with the previous vapor stream 50 entering the regenerative heat exchanger 13. The solid residue 62 is stored 63 for further disposal. The vapor lock 64 keeps the stripping vapors from leaking into the pyrolysis section where the high temperature will produce unwanted coke. A hot gas generator 70 uses fuel to produce the needed hot gas 71, in this case combustion gas, entering the stripper section 22 of the screw reactor 51. The hot gas generator 70 is potentially fueled from the various collected gases 73 of the process as well as by additional fuel 74 of light oil or even heavy oil if appropriate. Burner air 72 is added as needed. Left over gas containing some burnable components is burned in a flare 80 if appropriate using an air blower 81. The heavy oil condenser 52 and the light oil condenser 16 may be air cooled if appropriate or some of the separated water 90, is potentially usable in conjunction with a cooling tower.

As noted previously in selected circumstances the pyrolysis reactor is not employed; thus, the solid material or remainder left from the stripping reactor is the final discharged solid. Also in this instance the stripping reactor is likely operated with a higher temperature hot gas.

Several equivalents can be employed. For instance, the hot gas generator 70 is replaceable by a steam generator using recycled overhead flash water as feed or a separate steam source, if available, is employed. The stripping gas now is high temperature steam; however, the condensed heavy oil will must be separated from water condensing from said steam.

Another equivalent substitutes a fluidized bed reactor for the screw reactor where pyrolysis, or in some instances both pyrolysis and combustion, can proceed, separately if the overhead streams from a series of fluidized beds are employed and are collected independently. Another advantage for using a fluidized bed is that it eliminates the hot gas generator as a separate unit; it and the fluidized bed are combined. The economics generally favors a screw reactor for a small process with a portable system; however, if the process is setup permanently in a refinery, then the fluidized bed form is likely more efficient.

Another equivalent substitutes a moving screen, or alternatively a moving porous belt or other moving floor reactor, for the screw reactor either in the stripping or pyrolyzing sections or both.

The reactor is shown horizontal in FIG. 1; however, it is potentially usable at inclined angles, perhaps up to 15 degrees for either the stripping section or the pyrolyzing section or both. Thus a further equivalent substitutes an inclined fluidized bed reactor for the screw reactor either is in the stripping or pyrolyzing sections or both.

The sweep gas employed by the pyrolysis is often separately supplied but potentially is obtainable from some excess hot gas. Although said sweep gas is often inert, in this instance such hot gas can contain oxygen in small amounts if compatible with the hydrocarbon characteristics of the tank bottoms.

The largely pure water condensed from the overhead of the flash tank is returnable to the field pit or sludge pond if desired and represents a potential recycled component.

The general design criteria represents a potential recovery of about 85-90 percent of the amount of original oil in the tank bottoms. The recovery split between heavy and light oil is difficult to generalize since it depends so much upon the original composition of the tank bottoms. The pyrolysis unit is designed to enhance the gas generation usable for fuel as well as reduce the oil content of the residue solid.

The designation of light and heavy oil is somewhat arbitrary; however, with this process definitely one collected oil liquid is heavier, that is, more viscous with a higher standard boiling point curve, than the other. Of course, in both instances these liquid oil streams are now of refinery standard since water and solids have been largely removed.

Common regenerative heat exchangers are employed and it is desirable to obtain 70-90 percent thermal efficiency. The regenerative label means that at least one stream is recycled from some other part of the process. An open-type heat exchange is employed in the stripping section of the reactor since the two streams physically mix and in addition mass transfer occurs between the streams.

In all cases the discharged residue may have the additional option of being burned so as to render any metals into an environmentally acceptable oxidized state.

EXAMPLE 1

A pilot plant scale operation was employed to test the overall process for a heat load design that could be potentially field employed. An operating screw obtained from Moore Bearing Co., Cheyenne, Wyoming, was converted into the small screw reactor. It had a two inch diameter screw easily turning in a cylindrical case slightly larger; tolerances from one sixteenth to one quarter inch are common. Ideally the stripper section, about six foot long, would utilized trough container for the screw with a lower plenum chamber to distribute the hot gas flow, since direct contact between the hot gas and the solid material was desired; however, for this experimental setup a temporary hot gas plenum was employed. An upper plenum directed the flowing vapor stream leaving the stripper section into a conventional gas transfer system. The vapor lock section consisted of a plain section of screw and cylindrical container, maybe two foot in length, since the solid material augering through acted as a sealing medium. Thus any reasonable length representing several screw revolutions acted as an appropriate seal since no large pressure difference existed across it. The pyrolysis section was about four foot in length with a jacketed outer chamber containing a heating medium, such as steam, or alternately wrapped with electrical heating tape, to heat the augered material to pyrolysis temperatures. Provision to have a countercurrent sweep gas was incorporated. A variable speed drive was used and adjusted so that the residence time of the feed was approximately 30 to 45 minutes, preferably the latter. In the subject runs ten pounds per hour became the feed rate. The hot gas at about 900° F. fed the stripper section, while the pyrolysis section was electrically heated to approximately 1000° F. with a separate sweep gas employed. In all instances the target of 85 percent recovery of the oil in the tank bottoms was obtained. However, heat load conditions were such that it became imperative to add a flash tank, FIG. 1, before the screw reactor to not only regeneratively recover heat but largely pre-recover the water and certain light oil and thus lower the load on said screw reactor.

EXAMPLE 2

The screw reactor is no t a usual off-the-shelf component; however, it is potentially obtained by specifying the characteristics, such as size, length, pitch of screw, material of screw and housing, non-standard housing characteristics, motor size and speed, type of drive such as belt or chain, gear reduction box ratios, type of bearings, provisions for adding and removal of solids, temperature range of operation, and any other unique characteristics. With these specifications fabrication is performed of the desired screw reactor, such as by Acrodyne Corporation, Denver, Colo., or Moore Bearing Co., Cheyenne, Wyo.

Further U.S. Pat. No. 4,347,119 described in considerable detail similar screw reactors employed for oil shale and tar sands usage, and information from this specification is hereby incorporated by reference.

EXAMPLE 3

The control for the system was several fold. The residence time was set by the screw speed to 30–45 minutes; however, the preferred time was closer to the latter. For this residence time sufficient contact area was supplied for the stripping section to target the desired recovery of approximately 95 percent of the liquid oil. The temperature of the hot gas feeding the stripper section was adjusted to approximately the temperature needed to make 95 percent vapor from the original tank bottoms feed oil as determined by numerical simulation, or alternatively by experiment. A common atmospheric boiling point curve run on this tank bottoms feed oil sample can obtain this information. For instance, in typical simulation tests on a representative tank bottoms sample the 95 percent boiling temperature was estimated at 893° F.; thus, 900° F. was used as a set point for the hot gas.

The pyrolysis section was heated sufficiently to bring the solid material being augered through to a temperature of at least approximately 1000° F. This was a practical temperature limitation since the pyrolysis and thermal cracking that occurred produced a significantly higher fraction of coke as the temperature increased much beyond this value.

Depending upon the original tank bottoms composition the gas yield at the heavy oil condenser and the light oil condenser and water separator is usually sufficient to produce needed hot gas to obtain the proper hot gas temperature. In the test runs this was the situation, for in fact, extra gas was present that was flared. If insufficient gas were present, then auxiliary fuel, either light or heavy oil, is needed in the hot gas generator.

TABLE 1

| | Test Run Data | | | |
|---|---|---|---|---|
| | Mass (pounds) | | | |
| Component | Oil | Water | Solid | Temp. (°F.) |
| Feed tank bottoms | 90 | 5 | 5 | 60 |
| Flash tank feed | 90 | 5 | 5 | 360 |
| Flash tank vapor | 22 | 5 | 0 | 275 |
| Light oil | 18 | 0 | 0 | 100 |
| Light oil condenser gas | 4 | 0 | 0 | 100 |
| Flash tank liquid | 68 | 0 | 5 | 275 |
| Combustion gas | — | — | — | 900 |
| Stripping reactor vapor | 62 | 0 | 0 | 485 |
| Pyrolysis reactor vapor | 1 | 0 | 0 | 950 |
| Pyrolysis reactor residue | 5* | 0 | 5 | 990 |
| Pyrolysis reactor sweep gas | — | — | — | 60 |
| Heavy oil condenser feed | 63 | 0 | 0 | 250 |
| Heavy oil | 55 | 0 | 0 | 200 |
| Heavy oil condenser gas | 8 | 0 | 0 | 200 |

NOTES:
Basis was 100 pounds of tank bottoms.
Gas collected represents the equivalent of 12 pounds original tank bottoms oil.
78 percent of gas collected was used for combustor fuel.
22 percent of gas collected was flared.
*Equivalent oil as coke.

EXAMPLE 4

A typical test run of the process produced the results as shown in Table 1 and met well the design criteria stated above.

The foregoing description of the specific embodiments will so fully reveal the general nature of the invention that others can, by applying current knowledge, readily modify and/or adapt for various applications such specific embodiments without departing from the generic concept, and therefore such adaptations or modifications are intended to be comprehended within the meaning and range of equivalents of the disclosed embodiments. It is to be understood that the phraseology or terminology herein is for the purpose of description and not of limitation.

We claim:

1. A process for the recovery of tank bottom wastes comprising:
    employing a flash tank fed with tank bottom wastes, wherein the operating conditions comprise a pressure range of about 75-500 psia and a temperature range of about 300°-450° F., and separating a flashed overhead comprising light oil, gas and steam and heavier bottoms;
    stripping vapor from said heavier bottoms, wherein the stripping apparatus is selected from the group comprising a screw reactor, fluidized bed reactor, moving screen reactor, and combinations thereof, by utilizing hot combustion gas; and
    employing a heat exchanger with said vapor transferring heat to said tank bottom wastes before entering said flash tank.

2. The process according to claim 1 wherein said hot combustion gas further comprises burning fuel recycled from gaseous or liquid product streams producing a temperature for said combustion gas in the range of about 800°-900° F.

3. A process for the recovery of tank bottom wastes comprising:
    employing a flash tank fed with tank bottom wastes, wherein the operating conditions comprise a pressure range of about 75-500 psia and a temperature range of about 300°-450° F., and separating a flashed overhead comprising light oil, gas and steam and heavier bottoms;
    stripping vapor from said heavier bottoms, wherein the stripping apparatus is selected from the group comprising a screw reactor, fluidized bed reactor, moving screen reactor, and combinations thereof, by utilizing hot combustion gas producing a first vapor stream and a solid remainder;
    pyrolyzing said solid remainder, wherein the pyrolyzing apparatus is selected from the group comprising a screw reactor, fluidized bed reactor, moving screen reactor, and combinations thereof, by heating to a temperature about 1000° F. producing a second vapor stream and a solid residue; and
    employing a heat exchanger using one or both vapor streams to transfer heat to said tank bottom wastes before entering said flash tank.

4. The process according to claim 3 wherein said hot combustion gas further comprises burning fuel recycled from gaseous or liquid product streams producing a temperature for said combustion gas in the range of about 800°-900° F.

5. The process according to claim 3 wherein said solid remainder further comprises operating with a composition containing about five percent of the liquid oil from said tank bottom wastes.

6. The process according to claim 3 wherein said solid remainder further comprises passing through a vapor lock separating said stripping reactor from said pyrolysis reactor.

7. The process according to claim 3 wherein said pyrolyzing further comprises operating with a sweep gas comprising recycled overhead gas.

8. The process according to claim 3 wherein said solid residue further comprises operating with a composition containing a range of about 5-10 percent of the organic carbon from said tank bottom wastes.

9. A method for the processing of tank bottom wastes comprising:
    employing a flash tank fed tank bottom wastes entering at a pressure range of about 20-500 psia and a temperature range of about 250°-450° F. and producing a flashed overhead, condensed into a light oil segment and a water segment with a gaseous remainder, and a flash tank heavier bottoms with a temperature range of about 200°-425° F.;
    employing a stripping screw reactor fed with said heavier bottoms along with combustion gas, produced from burning recycled material selected from gaseous remainder, light oil and heavy oil or combinations thereof, entering at a temperature above about 250° F., with an upper plenum gas vapor stream and a solid remainder left within said screw reactor;
    passing said solid remainder through a vapor lock separating said stripping screw reactor from said pyrolysis screw reactor;
    employing a pyrolyzing screw reactor fed with a sweep gas, produced by recycling gaseous remainder, heating said solid remainder to a temperature above about 1000° F., operating with an upper plenum vapor stream crated by said sweep gas and discharging a solid residue containing in the range of about 5-10 percent of the organic carbon present in said tank bottom wastes; and
    employing a heat exchanger with said vapor overhead stream transferring heat to said tank bottom wastes before said hot gas is condensed into a heavy oil segment and a gaseous remainder, and then said tank bottom wastes, now heated, entering said flash tank.

* * * * *